J. H. NORRIS.
METER.
APPLICATION FILED MAY 24, 1916.
1,361,656.
Patented Dec. 7, 1920.
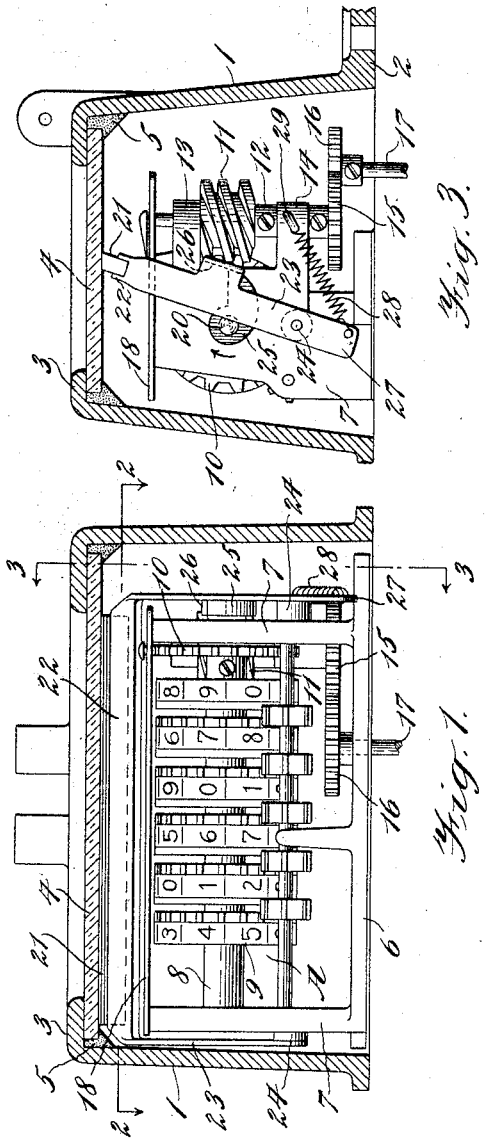
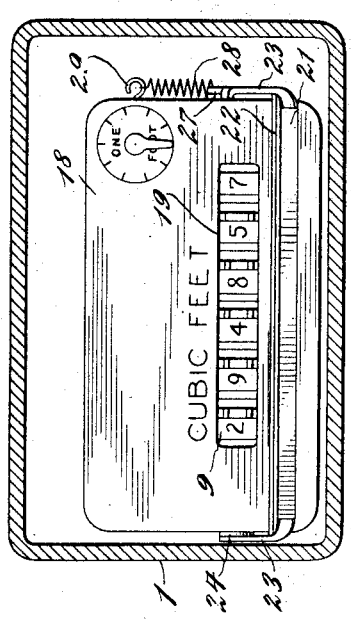
Witnesses:
Geo. E. Cheney
E. M. Lockwood
John H. Norris, Inventor
By his Attorneys
Gifford & Bull

UNITED STATES PATENT OFFICE.

JOHN H. NORRIS, OF NEW YORK, N. Y.

METER.

1,361,656.  Specification of Letters Patent.  Patented Dec. 7, 1920.

Application filed May 24, 1916. Serial No. 99,509.

*To all whom it may concern:*

Be it known that I, JOHN H. NORRIS, a citizen of the United States, residing at New York city, borough of Manhattan, in the county of New York and State of New York, have invented certain new and useful Improvements in Meters, of which the following is a specification.

My invention relates to new and useful improvements in meters, and more particularly to water meters, in which a dial glass or other transparent plate covers a dial or other indicating means, through which dial glass or transparent plate the indications on the dial or said indicating means are visible. The object of my invention is to provide a cleaning mechanism, preferably in the form of a wiper, arranged to be movable in contact with the under face of the dial glass and driven by the meter mechanism to maintain the under face of the dial glass clean and clear, so that the dial or indicating mechanism will at all times be clearly and completely visible to the reader.

The invention consists in the improvements to be fully described hereinafter, and the novelty of which will be particularly pointed out and distinctly claimed.

I have fully and clearly illustrated a preferred embodiment of my invention in the accompanying drawings to be taken as a part of this specification, and wherein—

Figure 1 is a sectional view taken through that part of a meter casing which incloses the indicating mechanism, the latter being shown in side elevation, Fig. 2 is a section on the line 2—2 of Fig. 1, and Fig. 3 is a section on the line 3—3 of Fig. 1.

I have fully illustrated in the drawings that portion of the meter casing associated with the indicating mechanism and carrying the dial glass, and have omitted the measuring mechanism in view of the fact that my invention will be readily understood without illustration of the measuring mechanism. I also desire it understood that the invention is applicable to various types of meters without regard to the type or specific construction either of the indicating mechanism or measuring mechanism.

Referring to the drawings by characters of reference, 1 designates that portion of the meter casing which contains the registering mechanism shown generally at A. A portion of the casing 1 is provided at its base with a flange 2, by means of which it is attached to the main body of the meter casing containing the measuring or driving mechanism, not shown, while the opposite end of the casing 1 is provided with an overhanging flange 3 against the under face of which is seated a dial or closure glass 4, which closes this end of the casing and is sealed in place by any suitable sealing means 5. Within this casing, as heretofore stated, is arranged the registering or indicating mechanism A, comprising a frame consisting of a base 6 supporting standards or end plates 7, in which is journaled the shaft 8 bearing the registering or indicating wheels 9. The shaft 8 carries on one end a gear 10 driven by a worm 11 on a vertical shaft 12 journaled in bearings 13, 14, on one of the end plates 7. This shaft 12 carries at its lower end a gear 15 with which meshes a gear 16 on the upper end of the shaft 17 driven from the measuring mechanism or piston of the meter, not shown. In view of the fact that the specific construction of the registering or indicating mechanism forms no part of my invention, excepting in so far as it enters broadly into combination therewith, I do not deem it necessary to describe the same in greater detail than by the description just given.

Arranged over the indicating wheels 9 and supported by the upper ends of the standards 7 is a dial plate 18 having a slot or aperture 19 through which the indicating wheels, heretofore referred to, are visible, in order that the condition of the meter may be read. At one end the shaft 8 is extended as at 20, for a purpose to be presently described.

21 designates a wiper member consisting of felt, rubber, or other suitable substance, the latter being arranged between the dial glass and the dial plate and carried by a bar 22, the latter being supported by the upper ends of arms 23 arranged outside of the end plates 7 and pivoted to the latter as at 24, whereby the wiper member swings on an axis parallel to the plane of the dial glass in a straight line across and in contact with the under face of the latter.

Upon the shaft extension 20, heretofore described, is arranged a cam 25, preferably in the form of a spiral cam, adapted to engage a follower or projection 26 on one of the arms 23, whereby said arm is moved in one direction to carry the wiper across the under face of the dial glass. The same arm 23, preferably, which is engaged and moved by the cam 25 is extended below its pivot point, as at 27, and connected to the said extension 27 is one end of a contractile spring 28, the other end of which is anchored to the end plate 7 in any suitable manner, as at 29. It will be seen that during rotation of the shaft 8 the cam 25 will be moved in the direction of the arrow in Fig. 2 to engage the follower 26, the latter being held in engagement with the cam by the spring 28, and when the cam has moved the wiper arm 23 in one direction to the full extent of movement permissible by the cam, the latter will ride off the follower 26 and the spring 28 will contract to throw the wiper in the opposite direction from that in which it was moved by the said cam. The follower 26 will then strike the low portion of the cam 25, and the continued rotation of the latter will repeat the movement of the wiper as described. It will be seen that the cam moves the wiper slowly in one direction and that the spring throws it quickly and positively in the opposite direction so as to effectively remove mist or deposit from the under face of the dial, and so that the wiper member will obstruct the view of the indicating mechanism for the least possible time. It is believed that the operation of the invention will be plain to one skilled in the art from the above description without repeating it.

I desire it understood that my invention is not limited to any particular part of the driven mechanism of the meter for driving the wiper, although I show the means for driving the wiper as being a cam connected to the shaft of the registering mechanism. Therefore, in the claims I use the term "meter mechanism" to include any driven part of a meter irrespective of whether it be the registering mechanism, or the measuring mechanism, which latter usually includes the piston and parts driven thereby to operate the registering mechanism.

What I claim and desire to secure by Letters Patent of the United States is—

1. In a meter, the combination of meter mechanism, a casing inclosing said mechanism and provided with a glass through which the indicator thereof is visible, a wiper contacting with the inner surface of said glass, a cam within the casing driven by the meter mechanism and adapted to move the wiper in one direction, and a spring for moving the wiper in the other direction.

2. In a meter, the combination of meter mechanism, a casing inclosing said mechanism and provided with a glass through which the indicator thereof is visible, a wiper comprising a member contacting with the inner surface of said glass and two supporting arms pivotally mounted within the casing to turn about an axis parallel to the plane of said glass, and a cam driven by the meter mechanism and arranged within said casing for moving the wiper about said axis.

3. In a meter, the combination of meter mechanism, a casing inclosing said mechanism and provided with a glass through which the indicator thereof is visible, a wiper arranged entirely within the casing and contacting with the inner surface of said glass, means whereby the meter mechanism moves the wiper in one direction, and independent means, within the casing, for moving the wiper in the opposite direction.

4. In a meter, the combination of meter mechanism, a casing inclosing said mechanism and provided with a glass through which the indicator thereof is visible, a wiper comprising a member contacting with the inner surface of said glass and two supporting arms pivotally mounted within the casing to turn about an axis parallel to the plane of said glass, a cam driven by the meter mechanism and engaging one of said arms to rock the wiper in one direction, and a spring for moving the wiper in the opposite direction, all of said parts being inclosed within said casing.

5. In a meter, the combination of meter mechanism, a casing inclosing said mechanism and provided with a glass through which the indicator thereof is visible, a wiper arranged entirely within the casing and contacting with the inner surface of said glass, a spiral cam driven by the meter mechanism for moving the wiper in one direction, and a spring for moving the wiper in the opposite direction all of said parts being inclosed within said casing.

6. In combination, a meter mechanism, a casing inclosing said mechanism and provided with a substantially flat transparent member through which the meter indicator is visible, a pivoted wiper engaging the inner surface of said transparent member over the indicator, a cam driven by the meter mechanism for moving said cleaner across said transparent member in one direction, and in parallel relation thereto, and means for quickly returning said wiper across said transparent member in the opposite direction.

7. In combination, a meter mechanism, a casing inclosing said mechanism and provided with a substantially flat transparent member through which the meter indicator is visible, a pivoted wiper engaging the inner surface of said transparent member over the indicator, a cam driven by the meter mechanism for moving said cleaner across said transparent member in one direction, and in parallel relation thereto, and a spring for quickly returning said wiper across said transparent member in the opposite direction.

In testimony whereof I have hereunto signed my name in the presence of two subscribing witnesses.

JOHN H. NORRIS.

Witnesses:
C. G. HEYLMUN,
M. E. McNINCH.